Patented Mar. 19, 1935

1,995,015

UNITED STATES PATENT OFFICE 1,995,015

COMPOSITION CONTAINING DERIVATIVES OF CELLULOSE

George W. Seymour, Cumberland, Md., assignor to Celanese Corporation of America, a corporation of Delaware No Drawing. Application April 16, 1932, Serial No. 605,792

3 Claims. (Cl. 106—40)

This invention relates to the preparation of compositions containing derivatives of cellulose, and relates more particularly to such compositions wherein a new plasticizer or softening agent is used.

An object of my invention is to prepare compositions such as plastic or liquid coating compositions containing derivatives of cellulose wherein a sulfonamide of an ether of a phenol is employed as a plasticizer. Other objects of my invention will appear from the following detailed description.

I have found that sulfonamides of ethers of phenols are capable of forming solutions with derivatives of cellulose and are an excellent plasticizer, softening agent, or camphor substitute for use in conjunction with derivatives of cellulose to impart softness, pliability and other desirable properties to plastics, films, textiles, and other materials containing derivatives of cellulose.

In accordance with my invention I prepare compositions containing derivatives of cellulose and a sulfonamide of an ether of a phenol as plastifier or softening agent.

Any suitable sulfonamide of an ether of a phenol may be employed. While I prefer to employ anisol sulfonamide $CH_3.O.C_6H_4.SO_2.NH_2$, other phenol ether sulfonamides may be employed; that is, sulfonamides of the ethers of phenols, cresols, naphthols and the like wherein one or more of the hydrogen atoms of the OH group of the phenol are replaced by alkyl, aryl or aralkyl or other groups. Examples of such phenol ethers of sulfonamide, in addition to anisol sulfonamide, are the sulfonamides of phenetol, $C_2H_5.O.C_6H_4.SO_2.NH_2$, the sulfonamide of ethyl or methyl ethers of $\alpha$ or $\beta$ naphthol, the sulfonamide of the methyl or ethyl ethers of resorcinol or pyrocatechol, the sulfonamid of diphenyl ether, etc. These compounds also include the alkyl sulfonamides of the phenol ethers, such as methyl-, ethyl-, dimethyl- or diethyl-sulfonamide, an example being ethyl anisol sulfonamide, $CH_3.O.C_6H_4.SO_2.NH.C_2H_5$.

The sulfonamide of the phenol ethers may be prepared by reacting the ether with sulfuric acid, converting the sulfonic acid so formed to the sodium or potassium salt, treating this salt with phosphorus pentachloride to convert the same into the sulfo-chloride and treating the sulfo-chloride with ammonia or substituted ammonias to form the sulfonamide.

Any suitable derivative of cellulose may be employed in conjunction with the sulfonamide of an ether of a phenol, such as cellulose nitrate but I prefer to employ organic derivatives of cellulose, such as organic esters of cellulose or cellulose ethers. Examples of organic esters of cellulose are cellulose acetate, cellulose formate, cellulose propionate and cellulose butyrate, while examples of cellulose ethers are ethyl cellulose, methyl cellulose and benzyl cellulose.

Plastic compositions containing the derivative of cellulose and the sulfonamide of an ether of a phenol may be made in any suitable manner and they may be worked up into sheets, rods, tubes, blocks or any other desired shape. Molding powder containing the derivative of cellulose and the sulfonamide of an ether of a phenol in intimate association but containing little or no solvent may be made, and these powders may be molded under heat and pressure to any desired shape. Filaments, yarns and other textile materials may be made from solutions containing the organic derivatives of cellulose and the phenol ether sulfonamide by extrusion through orifices into an evaporative atmosphere, as in dry spinning, or into a precipitating bath as in wet spinning.

Solutions of the organic derivative of cellulose and the phenol ether sulfonamide in a volatile solvent may be cast or extruded onto a smooth surface and the volatile solvent permitted to evaporate to form films that may be used for photographic or other purposes. An important application of this invention is in the preparation of laminated glass wherein a plastic sheet containing the derivative of cellulose and the phenol ether sulfonamide is interposed between sheets of glass. Coating compositions such as lacquers may be formed containing the derivative of cellulose and the phenol ether sulfonamide dissolved in appropriate solvent mixtures, and resins, either synthetic or natural, compatible with the derivative of cellulose may be added thereto.

The proportion of the phenol ether sulfonamide to the derivative of cellulose may be varied in accordance with the particular requirements. Generally I have found that in the case of its use with cellulose acetate, the phenol ether sulfonamide may be employed in amounts of 25 or less to 50% or more of the weight of the cellulose acetate.

In making the compositions in accordance with my invention, the phenol ether sulfonamide may be employed as the sole plastifying agent, or it may be used in conjunction with other plastifiers such as triacetin, dibenzyl tartrate, diethyl tartrate, dibutyl tartrate, diethyl phthalate, etc.

In making these compositions, solvents of appropriate nature, such as acetone, methyl acetate, ethylene formal, ethyl lactate, formal glycerol, diacetone alcohol, of varying boiling points may be used to suit the particular requirements. Effect materials such as pigments, filling materials or dyes may be added to produce any desired effect.

In order further to illustrate my invention but without being limited thereto, the following specific examples are given.

Example I

A coating composition may be made as follows:

| | Parts by weight |
|---|---|
| Cellulose acetate | 20 |
| Anisol sulfonamide | 10 |
| Acetone | 200 |

Example II

The following is an example of a lacquer:

| | Parts by weight |
|---|---|
| Cellulose acetate | 20 |
| Anisol sulfonamide | 10 |
| Synthetic resin of diphenylol formaldehyde type | 25 |
| Acetone | 100 |
| Alcohol | 20 |
| Benzene | 50 |
| Diacetone alcohol | 30 |

It is to be understood that the foregoing detailed description is given merely by way of illustration, and that many variations may be made therein without departing from the spirit of my invention.

Having described my invention, what I claim and desire to secure by Letters Patent is:

1. A composition of matter containing an organic derivative of cellulose and as plasticizer a sulfonamide of an ether of phenol selected from the group consisting of anisol and phenetol.

2. A composition of matter containing cellulose acetate and as plasticizer a sulfonamide of an ether of phenol selected from the group consisting of anisol and phenetol.

3. A composition of matter containing cellulose acetate and anisol sulfonamide as plasticizer.

GEORGE W. SEYMOUR.